United States Patent
Barrick et al.

(10) Patent No.: US 10,268,482 B2
(45) Date of Patent: *Apr. 23, 2019

(54) MULTI-SLICE PROCESSOR ISSUE OF A DEPENDENT INSTRUCTION IN AN ISSUE QUEUE BASED ON ISSUE OF A PRODUCER INSTRUCTION

(71) Applicant: International Business Machines Corporation, Armonk, NY (US)

(72) Inventors: Brian D. Barrick, Pflugerville, TX (US); Sundeep Chadha, Austin, TX (US); Michael J. Genden, Austin, TX (US); Jerry Y. Lu, Van Nuys, CA (US); Dung Q. Nguyen, Austin, TX (US); Nasrin Sultana, Austin, TX (US); David R. Terry, Austin, TX (US); David S. Walder, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 269 days.

This patent is subject to a terminal disclaimer.

(21) Appl. No.: 14/969,283

(22) Filed: Dec. 15, 2015

(65) Prior Publication Data
US 2017/0168831 A1   Jun. 15, 2017

(51) Int. Cl.
G06F 9/30 (2018.01)
G06F 9/38 (2018.01)
G06F 13/40 (2006.01)

(52) U.S. Cl.
CPC .......... *G06F 9/3836* (2013.01); *G06F 9/3001* (2013.01); *G06F 9/30043* (2013.01);
(Continued)

(58) Field of Classification Search
CPC .................................................. G06F 9/3836
See application file for complete search history.

(56) References Cited

U.S. PATENT DOCUMENTS 6,308,260 B1 * 10/2001 Le ..................... G06F 9/3836
                                                712/215
2010/0169622 A1 * 7/2010 Nguyen ............... G06F 9/3863
                                                712/228

(Continued)

FOREIGN PATENT DOCUMENTS

EP   2411908 B1   5/2013
GB   2492457 A    1/2013
WO   WO 2010/108819 A1   9/2010

OTHER PUBLICATIONS

Jin-Fu Li, Basic structure of computers, Jan. 23, 2005, 32 pages, [retrieved from the internet on Sep. 21, 2017], retrieved from URL <www.ee.ncu.edu.tw/~jfli/computer/lecture/ch02.pdf>.*

Dirk Meyer, The AMD-K7 processor, 1998, Microprocessor Forum, 16 pages, [retrieved from the internet on Sep. 21, 2017], retrieved from URL <www.es.ele.tue.nl/~heco/courses/et2-010/k7slides.pdf>.*

(Continued)

*Primary Examiner* — Jyoti Mehta
(74) *Attorney, Agent, or Firm* — Nathan M. Rau

(57) ABSTRACT

Operation of a multi-slice processor that includes execution slices and load/store slices coupled via a results bus includes: receiving, by an execution slice, a producer instruction, including: storing, in an entry of an issue queue, the producer instruction; and storing, in a register, an issue queue entry identifier representing the entry of the issue queue in which the producer instruction is stored; receiving, by the execution slice, a source instruction, the source instruction dependent upon the result of the producer instruction, including: storing, in another entry of the issue queue, the source instruction and the issue queue entry identifier of the producer instruction; determining in dependence upon the issue queue entry identifier of the producer instruction that the producer instruction has issued from the issue queue; and responsive to the determination that the producer instruction has issued from the issue queue, issuing the source instruction from the issue queue.

10 Claims, 5 Drawing Sheets

(52) U.S. Cl.
CPC ........ *G06F 9/3851* (2013.01); *G06F 13/4068* (2013.01); *Y02D 10/14* (2018.01); *Y02D 10/151* (2018.01)

(56) References Cited

U.S. PATENT DOCUMENTS

| | | | |
|---|---|---|---|
| 2010/0250900 A1* | 9/2010 | Brown | G06F 9/3814 712/208 |
| 2010/0251016 A1 | 9/2010 | Abernathy et al. | |
| 2012/0303936 A1 | 11/2012 | Tran et al. | |
| 2013/0007423 A1 | 1/2013 | Burcea et al. | |
| 2014/0068176 A1* | 3/2014 | Baryudin | G11C 15/00 711/108 |
| 2014/0108772 A1 | 4/2014 | Gschwind et al. | |

OTHER PUBLICATIONS

Onur Mutlu, Computer Architecture Branch Prediction, Feb. 11, 2013, 55 pages, [retrieved from the internet on Sep. 21, 2017], retrieved from URL <www.ece.cmu.edu/~ece447/s13/lib/exe/fetch.php?media=onur-447-spring13-lecture11-branch-prediction-afterlecture.pdf>.*

Appendix P; List of IBM Patents or Applications Treated as Related, Feb. 25, 2016, 2 pages.

Fu et al., "ORBIT: Effective Issue Queue Soft-error Vulnerability Mitigation on Simultaneous Multithreaded Architectures using Oper- and Readiness-based Instruction Dispatch", International Symposium on Computer Architecture and High Performance Computing (SBAC-PAD'08), Oct. 2008, pp. 71-78, IEEE Xplore Digital Library (online), DOI: 10.1109/SBAC-PAD.2008.13.

* cited by examiner

US 10,268,482 B2

MULTI-SLICE PROCESSOR ISSUE OF A DEPENDENT INSTRUCTION IN AN ISSUE QUEUE BASED ON ISSUE OF A PRODUCER INSTRUCTION

BACKGROUND OF THE INVENTION

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods of operation of a multi-slice processor, apparatus including a multi-slice processor, and multi-slice processors are disclosed in this specification. Such a multi-slice processor includes a plurality of execution slices and a plurality of load/store slices, where the load/store slices are coupled to the execution slices via a results bus. Operation of such a multi-slice processor includes receiving, by an execution slice from a dispatcher, a producer instruction, including: storing, in an entry of an issue queue of the execution slice, the producer instruction; and storing, in a register, an issue queue entry identifier representing the entry of the issue queue in which the producer instruction is stored; receiving, by the execution slice from the dispatcher, a source instruction, the source instruction dependent upon the result of the producer instruction, including: storing, in another entry of the issue queue, the source instruction and the issue queue entry identifier of the producer instruction; determining in dependence upon the issue queue entry identifier of the producer instruction that the producer instruction has issued from the issue queue; and responsive to the determination that the producer instruction has issued from the issue queue, issuing the source instruction from the issue queue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
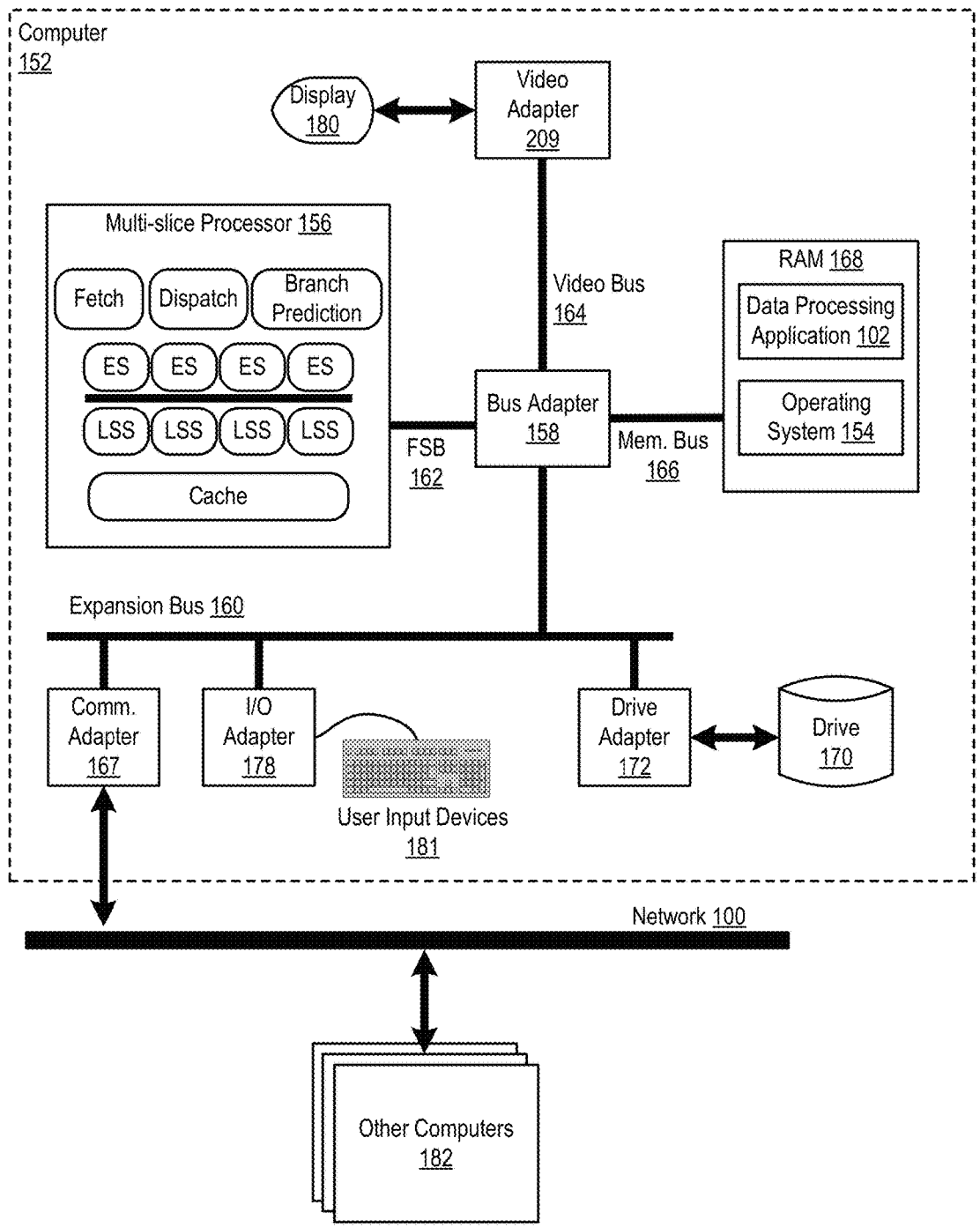
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™ Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
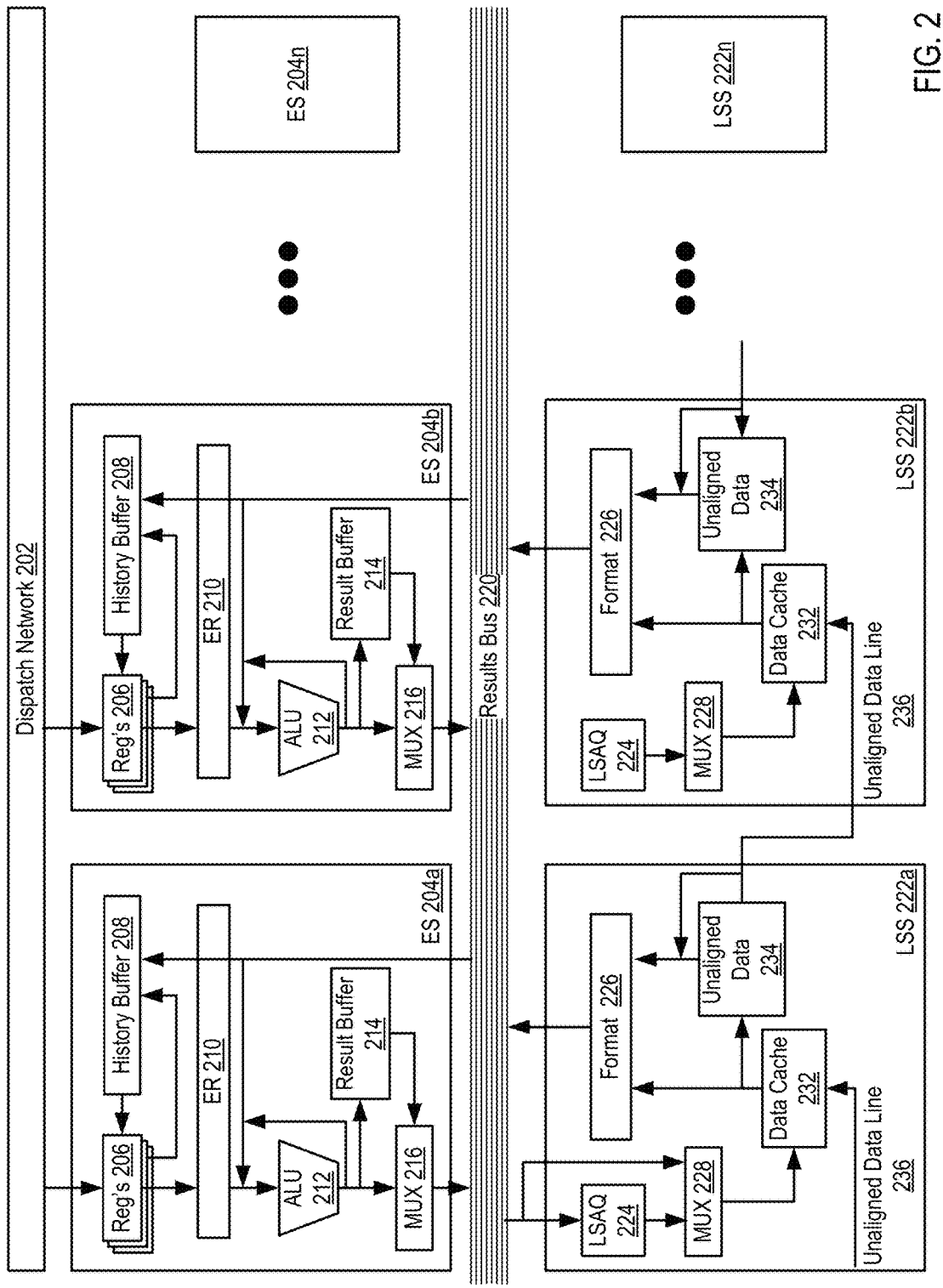
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
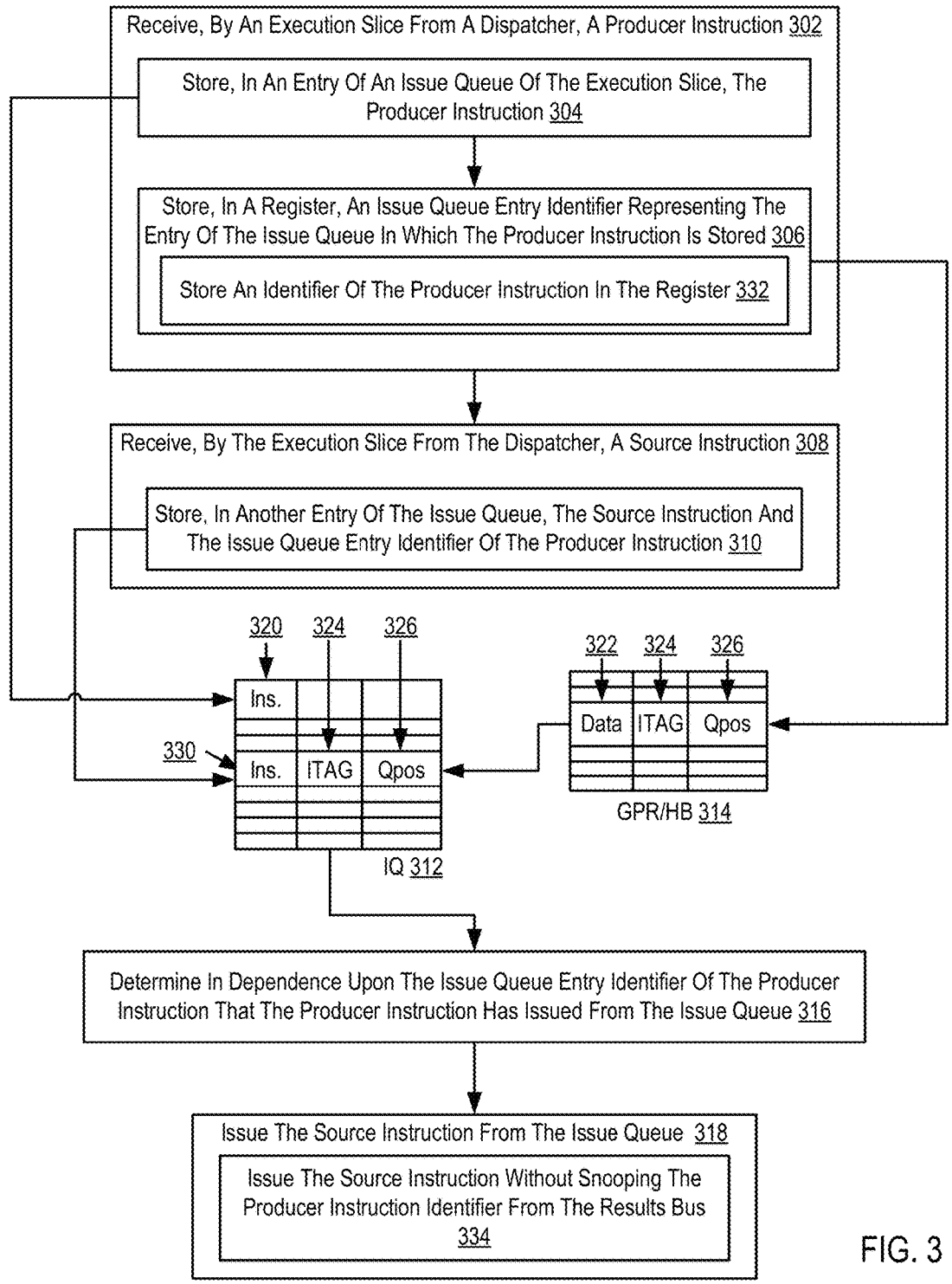
FIG. 3 sets forth a flow chart illustrating an exemplary method for operation of a multi-slice processor according to embodiments of the present invention.

For further explanation, FIG. 3 sets forth a flow chart illustrating an exemplary method for operation of a multi-slice processor according to embodiments of the present invention. The multi-slice processor for which the method of FIG. 3 depicts operation is similar to the multi-slice processor of FIG. 2 including, as it does, that includes a plurality of execution slices and a plurality of load/store slices. The load/store slices are coupled to the execution slices via a results bus.

The method of FIG. 3 includes receiving (302), by an execution slice from a dispatcher, a producer instruction. A producer instruction is an instruction is an instruction that when executed produces a result required for execution of another instruction, a source instruction. Receiving such a producer instruction may be carried out by receiving the instruction and the instruction's parameters from a dispatcher routing network such as that depicted in the example of FIG. 2. Such parameters may include an instruction identifier, referred to as an ITAG, a logical register indicating the target of the producer instruction, one or more operands, and in some embodiments, an indication of a location to be stored in an issue queue of the execution slice.

In the method of FIG. 3, receiving (302) the producer instruction includes storing (304) the producer instruction (320) in an entry of an issue queue (312) of the execution slice and storing (306) an issue queue entry identifier (326) representing the entry of the issue queue in which the producer instruction (320) is stored in a register (314). Such a register may include a general purpose register and later, when another instruction is issued having the same logical register, a history buffer. Additionally, other parameters may be stored (332) in the register (314) including the ITAG (324) of the producer instruction. The register may also include a field for storing data (322); the results of the producer instruction.

The method of FIG. 3 also includes receiving (308), by the execution slice from the dispatcher, a source instruction. In the method of FIG. 3 the source instruction is dependent upon the result of the producer instruction. Also in the method of FIG. 3, receiving (308) the source instruction includes storing (310), in another entry of the issue queue (312), the source instruction (330) and the issue queue entry identifier (326) of the producer instruction. In addition to the issue queue entry identifier, the ITAG (324) of the producer instruction may also be stored in the issue queue entry for the source instruction. Each of these producer instruction parameters and information may be retrieved from the register file in dependence upon the logical register of the source instruction where the logical register indicates and entry in the register file in which the producer instruction parameters are stored.

The method of FIG. 3 also includes determining (316) in dependence upon the issue queue entry identifier (326) of the producer instruction (320) that the producer instruction (320) has issued from the issue queue (312) and responsive to such a determination issuing (318) the source instruction (330) from the issue queue (312). In the method of FIG. 3, issuing (318) the source instruction from the issue queue (312) is carried out by issuing (334) the source instruction from the issue queue further comprises issuing the source instruction without snooping the producer instruction identifier from the results bus. In prior art processors, a source instruction in the issue queue may be issued only after snooping an ITAG of the producer from the results bus (indicating that the producer has issued for execution and returned a result). In the method of FIG. 3, by contrast, the source instruction may issue without snooping such an ITAG, instead issuing promptly after the producer instruction issues. Such issue queue processing reduces the number of comparisons necessary for the issue queue to perform in order to snoop the ITAG of the producer instruction from the results bus. In fact, given a large bus with many results presented on the bus over time, the number of comparisons made between the results presented on the results bus and the ITAG of the producer instruction may be quite high. Each such comparison results in power consumption. As such, reducing those comparisons, in fact eliminating such comparisons, results in reduced power consumption. Further, the producer instruction may take some time to complete before the results and the ITAG of the producer instruction are presented on the bus. Rather than waiting that entire time in the issue queue, the source instruction in the example of FIG. 3 may immediately issue after the producer instruction issues, thus increasing efficiency of instruction execution in the multi-slice processor.

Figure 4:
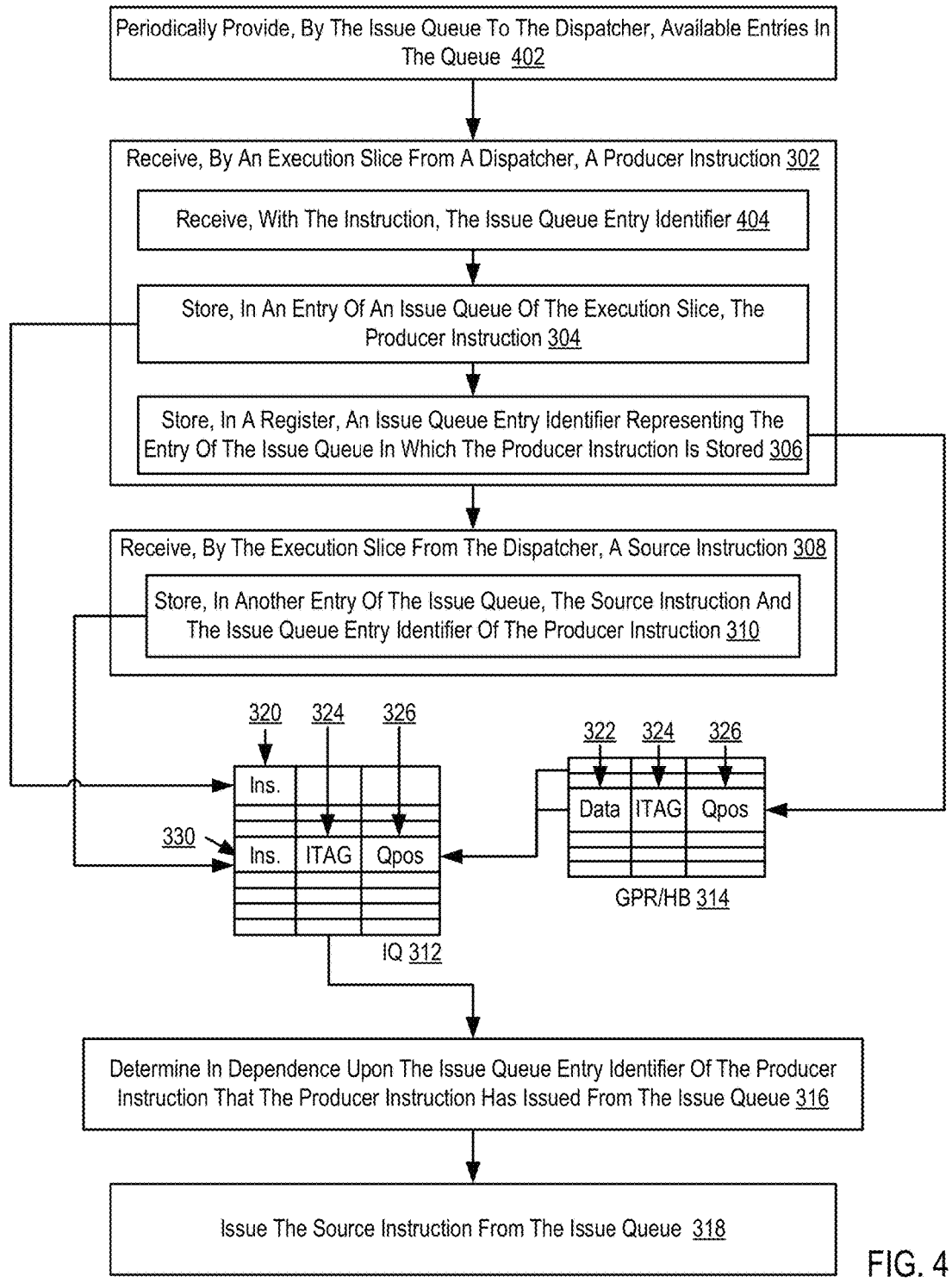
FIG. 4 sets forth a flow chart illustrating a further exemplary method for operation of a multi-slice processor according to embodiments of the present invention.

For further explanation, FIG. 4 sets forth a flow chart illustrating a further exemplary method for operation of a multi-slice processor according to embodiments of the present invention. The method of FIG. 4 is similar to the method of FIG. 3 in that the multi-slice processor for which the method of FIG. 4 depicts operational steps is similar to that of FIG. 3 and the method of FIG. 4 includes: receiving (302), by an execution slice from a dispatcher, a producer instruction; receiving (308), by the execution slice from the dispatcher, a source instruction; determining (316) in dependence upon the issue queue entry identifier of the producer instruction that the producer instruction has issued from the issue queue; and responsive to the determination, issuing (318) the source instruction from the issue queue.

The method of FIG. 4 differs from the method of FIG. 3, however, in that the method of FIG. 4 also includes periodically providing (402) by the issue queue to the dispatcher, available entries in the queue. The issue queue (which also includes all the logic that maintains and processes the issue queue entries) may maintain a bit vector that indicates available entries. Consider, for example, an issue queue with eight entries, where the second through sixth entry includes an instruction that has not yet been issued. The first, seventh, and eight entries are available for new instructions. The issue queue then may maintain a bit vector of 01111100 that is available or transmitted to the dispatcher. Once an instruction issues, the bit corresponding to the entry may be switched from a 1 to a 0 indicating the entry's availability to store an instruction.

To that end, receiving (302) the producer instruction in the method of FIG. 4 is carried out by receiving (404), with the instruction, the issue queue entry identifier (326). That is, in some embodiments, the dispatcher, with knowledge of the available entries, may indicate to the issue queue which entry the producer instruction is to be stored.

Figure 5:
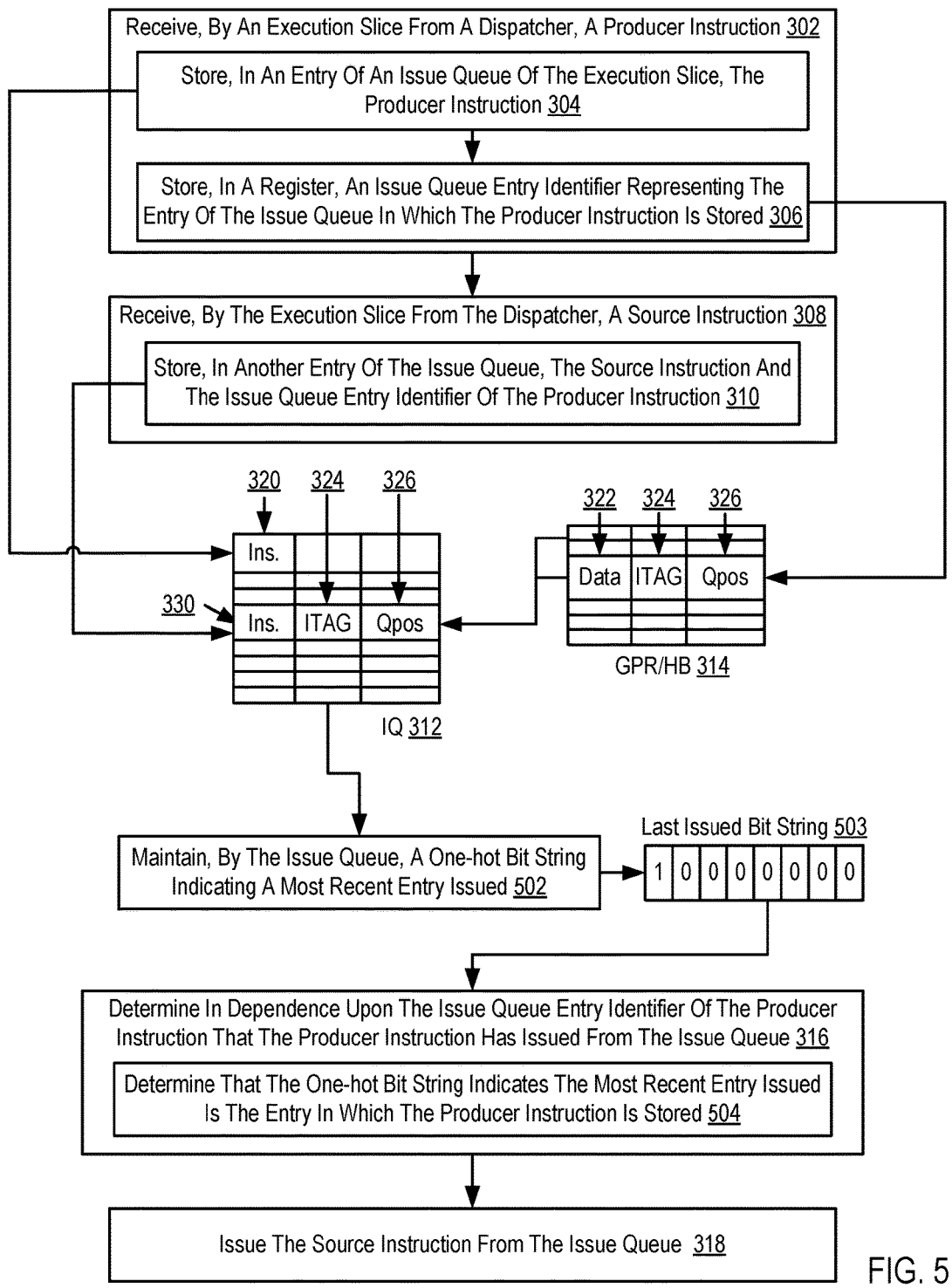
FIG. 5 sets forth a flow chart illustrating a further exemplary method for operation of a multi-slice processor according to embodiments of the present invention.

For further explanation, FIG. 5 sets forth a flow chart illustrating a further exemplary method for operation of a multi-slice processor according to embodiments of the present invention. The method of FIG. 5 is similar to the method of FIG. 3 in that the multi-slice processor for which the method of FIG. 5 depicts operational steps is similar to that of FIG. 3 and the method of FIG. 5 includes: receiving (302), by an execution slice from a dispatcher, a producer instruction; receiving (308), by the execution slice from the dispatcher, a source instruction; determining (316) in dependence upon the issue queue entry identifier of the producer instruction that the producer instruction has issued from the issue queue; and responsive to the determination, issuing (318) the source instruction from the issue queue.

The method of FIG. 5 differs from the method of FIG. 3, however, the method of FIG. 5 also includes maintaining (502), by the issue queue (312), a one-hot bit string (503) indicating a most recent entry issued. Maintaining such a bit string may be carried out by setting one bit in the bit string high, where that the position of that bit corresponds to the entry in the issue queue that most recently issued.

To that end, determining (316) that the producer instruction has issued from the issue queue is carried out by determining (504) that the one-hot bit string indicates the most recent entry issued is the entry in which the producer instruction is stored. The issue queue logic for the entry of the issue queue in which the source instruction is stored may be configured to periodically at inspect the one-hot bit string (503) upon every issuance, upon a predefined number of cycles, or using a particular countdown. Once the one-hot bit string indicates the entry for the producer instruction was the most recent entry to be issued, the source instruction may be issued (318) from the issue queue.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multi-slice processor comprising:
   a plurality of execution slices;
   a dispatcher; and
   a plurality of load/store slices, wherein each of the plurality of load/store slices are coupled to at least one of the plurality of execution slices via a results bus, and the multi-slice processor is configured for:
   receiving, by an execution slice of the plurality of execution slices from the dispatcher, a producer instruction, including:
      storing, in an entry of an issue queue in the execution slice, the producer instruction; and
      storing, in a register in the execution slice, an issue queue entry identifier representing the entry of the issue queue in which the producer instruction is stored;
   receiving, by the execution slice from the dispatcher, a source instruction, the source instruction dependent upon a result of the producer instruction, including:
      retrieving, from the register, the issue queue entry identifier representing the entry of the issue queue in which the producer instruction is stored; and
      storing, in another entry of the issue queue, the source instruction and the issue queue entry identifier representing the entry of the issue queue in which the producer instruction is stored;
   maintaining, by the issue queue, a one-hot bit string indicating a most recent entry issued;
   determining, by the execution slice, in dependence upon the issue queue entry identifier of the producer instruction that the producer instruction has issued from the issue queue, wherein determining that the producer instruction has issued from the issue queue further comprises determining that the one-hot bit string indicates the most recent entry issued is the entry in which the producer instruction is stored; and
   responsive to determining that the producer instruction has issued from the issue queue, issuing, by the execution slice, the source instruction from the issue queue.

2. The multi-slice processor of claim 1 further configured for:
   periodically providing by the issue queue to the dispatcher, available entries in the issue queue.

3. The multi-slice processor of claim 1 wherein:
   receiving the producer instruction further comprises receiving, with the producer instruction, the issue queue entry identifier.

4. The multi-slice processor of claim 1 wherein:
   storing, in the register, the issue queue entry identifier representing the entry of the issue queue in which the producer instruction is stored comprises storing an identifier of the producer instruction in the register; and
   wherein issuing, by the execution slice, the source instruction from the issue queue comprises issuing the source instruction without snooping the identifier of the producer instruction from the results bus.

5. The multi-slice processor of claim 1 wherein:
   each execution slice includes an instruction queue, a general purpose register, a history buffer, and an arithmetic execution unit, wherein each execution slice is associated with a load-store slice to form a single slice of the multi-slice processor.

6. An apparatus comprising:
   a multi-slice processor that includes a plurality of execution slices, a dispatcher, and a plurality of load/store slices, wherein each of the plurality of load/store slices are coupled to at least one of the plurality of execution slices via a results bus; and
   a computer memory operatively coupled to the multi-slice processor, wherein the multi-slice processor is configured for:

receiving, by an execution slice of the plurality of execution slices from the dispatcher, a producer instruction, including:
    storing, in an entry of an issue queue in the execution slice, the producer instruction; and
    storing, in a register in the execution slice, an issue queue entry identifier representing the entry of the issue queue in which the producer instruction is stored;

receiving, by the execution slice from the dispatcher, a source instruction, the source instruction dependent upon a result of the producer instruction, including:
    retrieving, from the register, the issue queue entry identifier representing the entry of the issue queue in which the producer instruction is stored; and
    storing, in another entry of the issue queue, the source instruction and the issue queue entry identifier representing the entry of the issue queue in which the producer instruction is stored;

maintaining, by the issue queue, a one-hot bit string indicating a most recent entry issued;

determining, by the execution slice, in dependence upon the issue queue entry identifier of the producer instruction that the producer instruction has issued from the issue queue, wherein determining that the producer instruction has issued from the issue queue further comprises determining that the one-hot bit string indicates the most recent entry issued is the entry in which the producer instruction is stored; and responsive to determining that the producer instruction has issued from the issue queue, issuing, by the execution slice, the source instruction from the issue queue.

7. The apparatus of claim 6, wherein the multi-slice processor is further configured for:
periodically providing by the issue queue to the dispatcher, available entries in the issue queue.

8. The apparatus of claim 6 wherein:
receiving the producer instruction further comprises receiving, with the producer instruction, the issue queue entry identifier.

9. The apparatus of claim 6 wherein:
storing, in the register, the issue queue entry identifier representing the entry of the issue queue in which the producer instruction is stored comprises storing an identifier of the producer instruction in the register; and
wherein issuing, by the execution slice, the source instruction from the issue queue comprises issuing the source instruction without snooping the identifier of the producer instruction from the results bus.

10. The apparatus of claim 6 wherein:
each execution slice includes an instruction queue, a general purpose register, a history buffer, and an arithmetic execution unit, wherein each execution slice is associated with a load-store slice to form a single slice of the multi-slice processor.

\* \* \* \* \*